Figure 1:
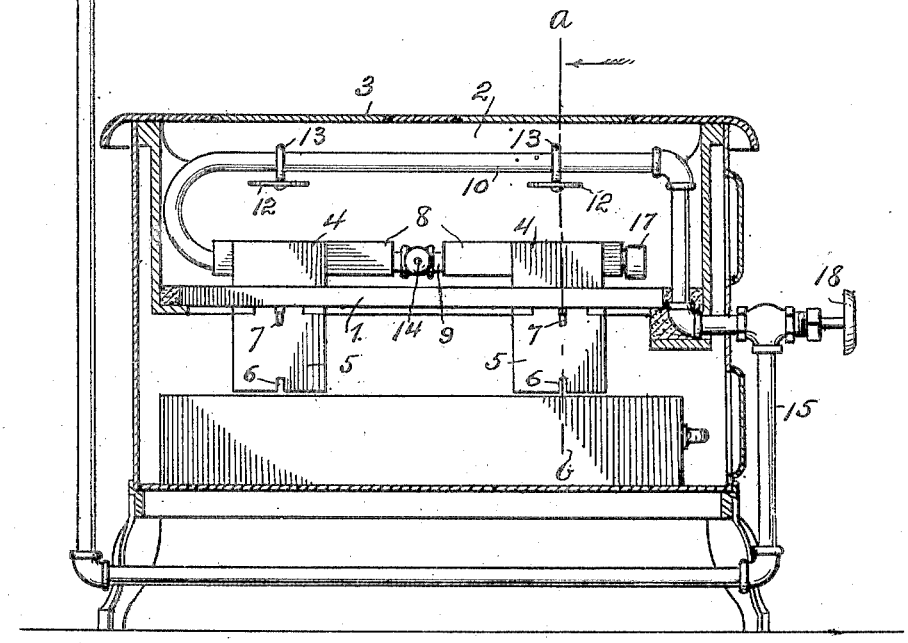

F. H. HAYERS.
HYDROCARBON BURNER.
APPLICATION FILED JULY 14, 1911.

1,009,744.

Patented Nov. 28, 1911.
3 SHEETS—SHEET 1.

WITNESSES:

INVENTOR.
Francis H. Hayers
BY Warren D. House
His ATTORNEY.

F. H. HAYERS.
HYDROCARBON BURNER.
APPLICATION FILED JULY 14, 1911.
1,009,744.
Patented Nov. 28, 1911.
3 SHEETS—SHEET 2.
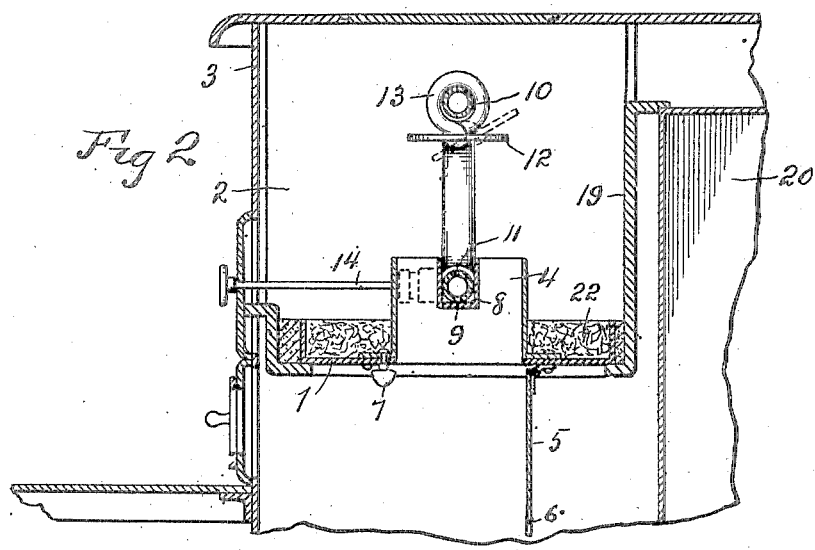
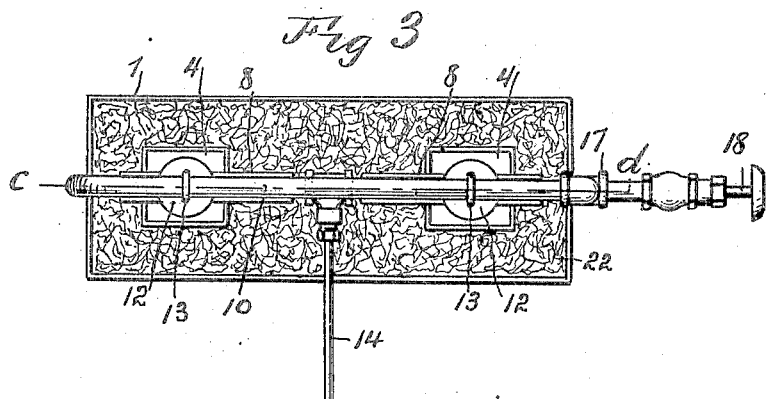
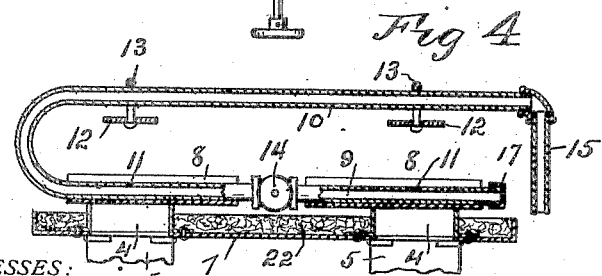
WITNESSES:
R. E. Hamilton
E. B. House
INVENTOR.
Francis H. Hayers
BY Warren D. House
His ATTORNEY.

F. H. HAYERS.
HYDROCARBON BURNER.
APPLICATION FILED JULY 14, 1911.
1,009,744.
Patented Nov. 28, 1911.
3 SHEETS—SHEET 3.
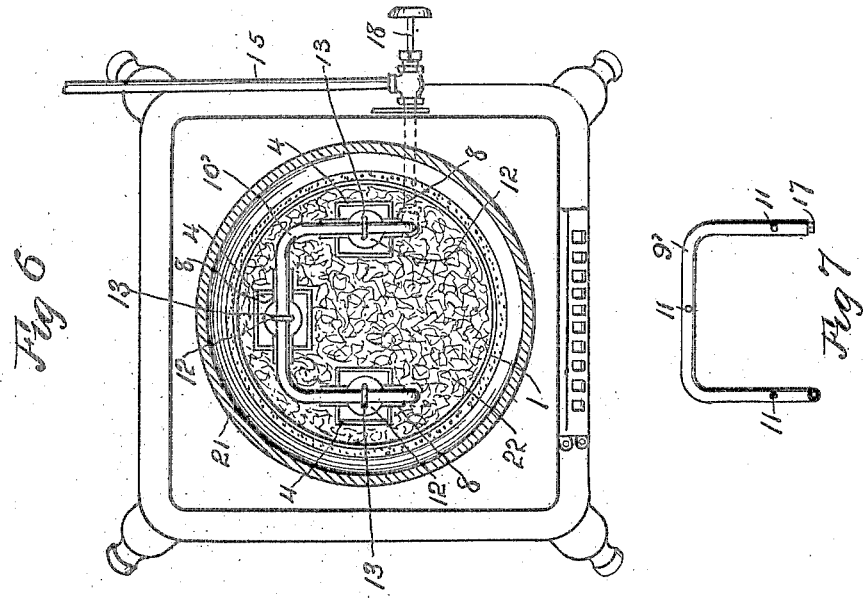
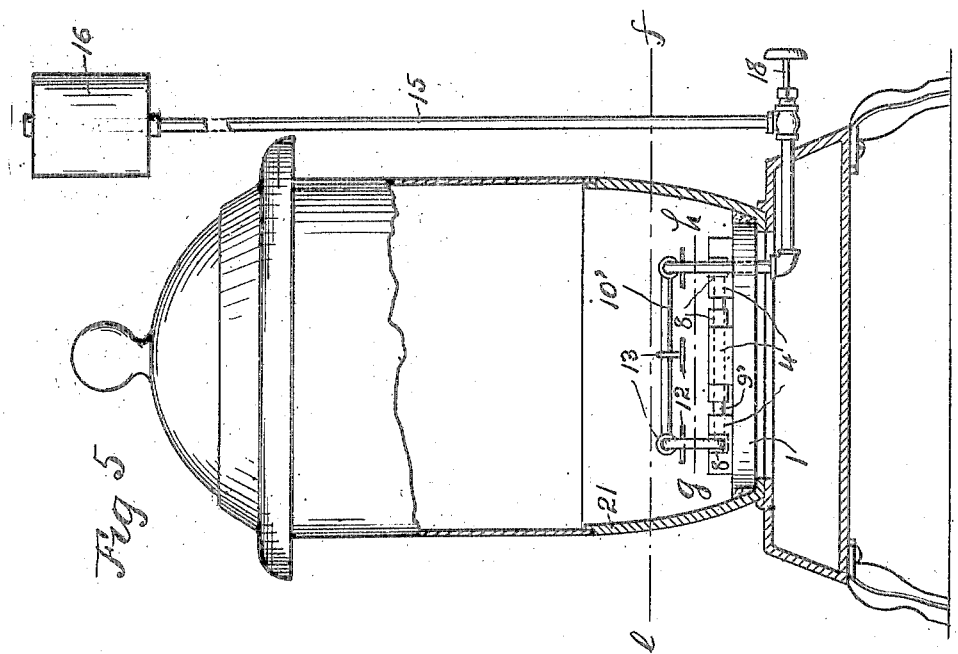
WITNESSES:
R. E. Hamilton
E. B. House
INVENTOR.
Francis H. Hayers
BY
Warren D. House
ATTORNEY.

UNITED STATES PATENT OFFICE.

FRANCIS H. HAYERS, OF HUTCHINSON, KANSAS.

HYDROCARBON-BURNER.

1,009,744.    Specification of Letters Patent.    Patented Nov. 28, 1911.

Application filed July 14, 1911. Serial No. 638,435.

*To all whom it may concern:*

Be it known that I, FRANCIS H. HAYERS, a citizen of the United States, residing at Hutchinson, in the county of Reno and State of Kansas, have invented certain new and useful Improvements in Hydrocarbon-Burners, of which the following is a specification.

My invention relates to improvements in hydrocarbon burners.

The object of my invention is to provide a burner which will efficiently burn crude oil, and which may be advantageously employed in common cooking and heating stoves.

The novel features of my invention are hereinafter fully described and claimed.

In the accompanying drawings, which illustrate my invention, Figure 1 is a side elevation of my improved burner mounted in a cook stove which is shown in vertical section. Fig. 2 is a vertical section on the line $a-b$ of Fig. 1. Fig. 3 is a top view of the burner shown in Figs. 1 and 2. Fig. 4 is a vertical section on the line $c-d$ of Fig. 3. Fig. 5 is a view partly in side elevation and partly in vertical section of a heating stove provided with my improved burner, the burner being shown in elevation. Fig. 6 is a horizontal section on the line $e-f$ of Fig. 5. Fig. 7 is a horizontal section of the burner pipe taken on the line $g-h$ of Fig. 5.

Similar reference characters designate similar parts.

Referring to the form of my invention shown in Figs. 1 to 4, 1 designates a drip pan which, as shown in Figs. 1 and 2, is adapted to replace the bottom grate in the fire box 2 of a cook stove 3, of any usual type. The drip pan 1 is provided with one or more vertical air shafts 4, the upper ends of which are disposed above the bottom of the drip pan. Suitable closures may be provided for the said air shafts. In the drawings I have shown hinged closures 5 hinged to the bottom of the drip pan 1 at one set of edges and having the opposite set of edges provided with notches 6 adapted to receive therein respectively turn buttons 7 pivoted to the bottom of the drip pan. Supported by and extending across the air shafts 4 are horizontal troughs 8 having open ends which discharge into the drip pan 1. Mounted in the troughs 8 is the horizontal portion 9 of a burner pipe which is connected to a vaporizer 10 disposed above and parallel with the portion 9. The portion 9 is provided with discharge openings 11 disposed respectively above the air shafts 4. On the vaporizer 10 are deflectors comprising plates 12 having supporting rings 13 which are mounted on the vaporizer 10 and are preferably both circumferentially and longitudinally adjustable thereon. The deflectors are disposed respectively above the discharge openings 11. A shut off cock 14 may be provided in the portion 9 between the discharge openings 11, so that one of the discharge openings may be cut off from the oil supply. The vaporizer 10 is connected by a pipe 15 to a supply tank 16 disposed so as to feed the oil by gravity. One end of the burner pipe is closed by a cap 17. The pipe 15 may be provided with a shut off cock 18.

In the operation of the mechanism just described, when both discharge openings 11 are to be used, the cocks 14 and 18 are opened. The oil then passes by the pipe 15 from the tank 16 to and through the vaporizer 10 into the burner pipe 9, from which it passes through the discharge openings 11 into the troughs 8, escaping therefrom into the drip pan 1. The oil in the drip pan is ignited, and the flame from the burning oil heats the burner pipe 9, thereby vaporizing the oil which is discharged through the openings 11 against the deflector plates 12. By reason of the discharge openings 11 being above the air shafts 4 a plentiful supply of oxygen is supplied to and mixes with the oil vapor. Very often the holes 11, which are usually drilled in the burner pipe, are not exactly vertical but inclined. By having the deflectors movable lengthwise on the vaporizer 10, they may be adjusted to the proper position for intercepting the jets discharged from the openings 11. By having the deflectors circumferentially adjustable on the vaporizer 10, the deflectors may be adjusted so as to deflect the jets more or less toward the fireback 19 of the stove, thus increasing or decreasing the amount of heat applied to the forward side of the oven 20. In case that but one jet is required for doing the cooking desired, the cock 14 may be closed. The closure 5 at the right of the cock 14, as viewed in Fig. 4, is then swung to the closed position, in which position it is secured by the turn button 7 adjacent thereto. The air shaft 4 thus closed will not permit passage of air, thus causing what air is admitted to the fire box through the drip pan to pass through the unclosed air shaft 4 and thereby increasing the draft and amount of air supplied to the jet which is discharged above the open shaft.

In the form of my invention shown in Figs. 5, 6 and 7, the construction is very similar to that already described. The drip pan 1 is shown as circular in form to fit the bottom of the fire bowl 21 in place of the ordinary bottom grate. The drip pan is shown provided with three air shafts 4. Three troughs 8 are respectively mounted on the air shafts 4 and have mounted in them the U shaped burner pipe 9' connected to a vaporizer 10' which is also U shaped and has mounted on it three pivotally and slidably mounted deflectors, which may be adjusted so that the plates 12 thereof will throw the deflected jets issuing from the discharge openings 11 against the inner side of the fire bowl 21, or, as shown in Fig. 5, the plates 12 may be disposed horizontally. The vaporizer 10' is connected with the tank 16 by the pipe 15, which as in the other form of my invention may be provided with a shut off cock 18.

The operation of the form of my invention just described is the same as the other form, so no additional description is required.

The drip pan 1 may be filled with asbestos 22. The troughs 8 serve both as supports for the burner pipe and to prevent the passage of oil into the air shafts 4.

I do not limit my invention to the structures shown and described as many modifications, within the scope of the appended claims, may be made without departing from the spirit of my invention.

Having thus described my invention, what I claim and desire to secure by Letters Patent, is:—

1. In a hydrocarbon burner, a drip pan having a vertical air shaft, a trough extending across the air shaft and discharging into the drip pan, and a burner pipe mounted in the trough, and having a discharge opening over the air shaft.

2. In a hydrocarbon burner, a drip pan having a vertical air shaft, a trough extending across the air shaft and discharging into the drip pan, a burner pipe mounted in the trough and having a discharge opening over the air shaft, and a closure for the air shaft.

3. In a hydrocarbon burner, a drip pan having a plurality of vertical air shafts, troughs extending across the air shafts respectively and discharging into the drip pan, and a burner pipe mounted in said troughs and having a plurality of discharge openings above said air shafts respectively.

4. In a hydrocarbon burner, a drip pan having a plurality of vertical air shafts, troughs extending respectively across said shafts and discharging into the drip pan, a burner pipe mounted in said troughs and having a plurality of discharge openings above said air shafts respectively, and closures for said air shafts.

5. In a hydrocarbon burner, a drip pan having vertical air shafts, troughs extending across said shafts respectively and discharging into the drip pan, a burner pipe mounted in said troughs and having a plurality of discharge openings above said air shafts respectively, a vaporizer connected to and disposed horizontally above and parallel with the burner pipe, and deflectors mounted adjustably on the vaporizer above said openings respectively.

6. In a hydrocarbon burner, a drip pan having a vertical air shaft, a trough extending across said shaft and discharging into the drip pan, a burner pipe horizontally mounted in the trough and having above the air shaft a discharge opening, a vaporizer connected to and disposed above and parallel with the burner pipe, and a deflector mounted adjustably on the vaporizer above the discharge opening.

7. In a hydrocarbon burner, a drip pan having a vertical air shaft, a trough extending across the shaft and discharging into the drip pan, a burner pipe horizontally mounted in the trough and having a discharge opening above the air shaft, a vaporizer connected to and disposed above and parallel with the burner pipe, and a deflector circumferentially adjustable on the vaporizer above said discharge opening.

8. In a hydrocarbon burner, a drip pan having a vertical air shaft, a trough extending across the shaft and discharging into the drip pan, a burner pipe horizontally mounted in the trough and having a discharge opening above the air shaft, a vaporizer connected to and disposed above and parallel with the burner pipe, and a deflector longitudinally adjustable on the vaporizer above the discharge opening.

9. In a hydrocarbon burner, a drip pan having a vertical air shaft, a trough extending across the shaft and discharging into the drip pan, a burner pipe horizontally mounted in the trough and having a discharge opening above the air shaft, a vaporizer connected to and disposed above and parallel with the burner pipe, and a deflector longitudinally and circumferentially adjustable on the vaporizer above the discharge opening.

10. In a hydrocarbon burner, a drip pan having two vertical air shafts, two troughs extending respectively across the air shafts and discharging into the drip pan, a burner pipe mounted in the troughs and having two discharge openings disposed respectively above the air shafts, a shut off cock in the burner pipe between said air shafts, and a closure for one of said air shafts.

In testimony whereof I have signed my name to this specification in presence of two subscribing witnesses.

FRANCIS H. HAYERS.

Witnesses:
J. R. GREEN,
RALPH E. MINIER.